(12) United States Patent
Dittrich et al.

(10) Patent No.: US 12,429,136 B2
(45) Date of Patent: Sep. 30, 2025

(54) PARKING LOCK SYSTEM FOR A VEHICLE TRANSMISSION

(71) Applicant: ZF Friedrichshafen AG, Friedrichshafen (DE)

(72) Inventors: Tobias Dittrich, Tettnang (DE); Tobias Miller, Waldburg (DE); Matthias List, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/763,692

(22) Filed: Jul. 3, 2024

(65) Prior Publication Data

US 2025/0012357 A1 Jan. 9, 2025

(30) Foreign Application Priority Data

Jul. 5, 2023 (DE) .......................... 102023206361.1

(51) Int. Cl.
*F16H 63/34* (2006.01)

(52) U.S. Cl.
CPC ..... *F16H 63/3466* (2013.01); *F16H 63/3433* (2013.01); *F16H 63/3491* (2013.01)

(58) Field of Classification Search
CPC ........................................ F16H 63/3416–3491
See application file for complete search history.

(56) References Cited

U.S. PATENT DOCUMENTS

| | | | | |
|---|---|---|---|---|
| 7,957,870 | B2 * | 6/2011 | Ross | B60K 23/04 701/84 |
| 9,869,389 | B2 * | 1/2018 | Rhoades | F16H 63/3433 |
| 10,598,280 | B2 * | 3/2020 | Scalici | F16H 63/3466 |
| 11,946,543 | B2 * | 4/2024 | Matsuo | F16H 63/3425 |
| 2020/0166130 | A1 * | 5/2020 | Kwon | F16H 63/3466 |

FOREIGN PATENT DOCUMENTS

| | | |
|---|---|---|
| DE | 102005024468 A1 | 12/2006 |
| DE | 102014223037 A1 | 5/2016 |
| DE | 102015200978 A1 | 7/2016 |
| DE | 102017218748 A1 | 4/2019 |
| DE | 102020206290 A1 | 11/2021 |

OTHER PUBLICATIONS

German Search Report for Application No. 102023206361.1 dated Feb. 22, 2024.

* cited by examiner

*Primary Examiner* — James J Taylor, II
(74) *Attorney, Agent, or Firm* — Dority & Manning, P.A.

(57) ABSTRACT

A parking lock system for motor vehicle transmissions has a locking pawl pivotable between an interlock position and a release position, and a first actuating element movable between a disengaged position and an engaged position, where movement of the first actuating element induces pivoting of the locking pawl. The system includes a second actuating element movable between an actuating position and an element release position, the second actuating element contacting and moving the first actuating element from the engaged position into the disengaged position when moving from the actuating position into the element release position. The system includes a spring element that moves the first actuating element into the engaged position when the second actuating element moves into the actuating position, and allows the first actuating element to move relative to the second actuating element into the disengaged position when the second actuating element is in the actuating position.

14 Claims, 5 Drawing Sheets

PARKING LOCK SYSTEM FOR A VEHICLE TRANSMISSION

CROSS-REFERENCE TO RELATED APPLICATION

The present application is related and has right of priority to German Patent Application No. 10 2023 206 361.1 filed on Jul. 5, 2023, the entirety of which is incorporated by reference for all purposes.

FIELD OF THE INVENTION

The invention relates generally to a parking lock system for a motor vehicle transmission. The parking lock system has a locking pawl pivotable about an axis, and a first actuating element movable between a disengaged position and an engaged position. The first actuating element, when moved from the disengaged position into the engaged position, inducing a pivoting of the locking pawl towards an interlock position in which an activated state of a parking lock is achieved, whereas the first actuating element, when moved from the engaged position into the disengaged position, effecting a pivoting of the locking pawl into a release position in which a deactivated state of the parking lock is achieved. The parking lock system further has a second actuating element for coupling to a control actuator, the second actuating element being movable between an actuating position and a release position. The parking lock system additionally has an emergency release device, via which the first actuating element is movable into its disengaged position. The invention also relates generally to a motor vehicle transmission having the aforementioned parking lock system.

BACKGROUND

In motor vehicle transmissions having starting components, including hydrodynamic torque converters, or having hydraulically actuated shift elements, it is not readily possible to secure the vehicle from rolling away other than by using the parking brake, since a mechanical connection of a prime mover to driven vehicle wheels is not maintainable once the prime mover is switched off and the hydraulic pressure subsequently drops. For this reason, separate parking lock systems are usually provided in such motor vehicle transmissions, which, when actuated, mechanically block the transmission. In such instances, an output-side transmission shaft is usually rotationally fixed on a housing of the motor vehicle transmission, and therefore, when the parking lock is activated, the output-side transmission shaft, and thus also the driven wheels, are prevented from rotating. The rotational fixation is often implemented via a pivotably mounted locking pawl, which, when the parking lock is activated, engages into tooth gaps on a parking interlock gear, which is non-rotatably connected to the shaft to be rotationally fixed.

The parking lock is often mechanically activated by spring force implemented via a spring element, whereas the parking lock is deactivated via an actuator associated with the parking lock system. An emergency release device is additionally provided in some parking lock systems for deactivating the parking lock, and thus for allowing movement of the associated motor vehicle, even if a control unit of the actuator fails. If measures are taken on the part of the actuator to lock the actuator in its current position, this deactivation must be carried out via an emergency release device in a manner that is decoupled from the actuator, in order not to damage the stopped or locked actuator in the course of the deactivation.

DE 10 2020 206 290 A1 discloses a parking lock system for a motor vehicle. In this parking lock system, when a parking lock is activated, a pivotably mounted locking pawl engages into one of multiple tooth gaps on a parking interlock gear, which rotationally fixes the parking interlock gear and thus also a transmission shaft connected to the parking interlock gear for conjoint rotation. The locking pawl is coupled to a first actuating element, the first actuating element being preloaded via a spring element into an engaged position, in which the first actuating element induces a pivoting of the locking pawl into an interlock position that permits engagement. The first actuating element is coupled via a coupling point to a second actuating element, to which a control actuator is connected. By this control actuator, the parking lock is deactivated by moving the second actuating element, via the control actuator, from an actuating position into a release position and thereby transferring the first actuating element from its engaged position into a disengaged position. In the latter, an engagement of the locking pawl into one of the tooth gaps on the parking interlock gear is released. Furthermore, a manually operable emergency release device is provided, via which the first actuating element is movable, without the control actuator leaving a current position, the control actuator being coupled to the second actuating element. This movement of the first actuating element relative to the second actuating element is achieved via two spring elements, which are spatially separated from one another.

SUMMARY OF THE INVENTION

Proceeding from the above-described prior art, a parking lock system is provided in which deactivation of a parking lock using an emergency release device is possible without affecting a current position of a control actuator. In addition, the parking lock system is made with low manufacturing effort.

According to the invention, a parking lock system has a locking pawl, which is pivotable about an axis, and a first actuating element, which is movable between a disengaged position and an engaged position. The first actuating element, when moved from the disengaged position into the engaged position, induces a pivoting of the locking pawl towards an interlock position in which an activated state of a parking lock is achieved. In contrast, the first actuating element, when moved from the engaged position into the disengaged position, induces a pivoting of the locking pawl into a release position in which a deactivated state of the parking lock is achieved. In addition, the parking lock system includes a second actuating element, which is used for coupling to a control actuator and is movable between an actuating position and a release position. Furthermore, the parking lock system has an emergency release device, via which the first actuating element is movable into its disengaged position.

In the parking lock system according to the invention, an activated state of the parking lock is brought about via the locking pawl, which is to be moved into an interlock position for this purpose. In the interlock position, the locking pawl prevents movement, in particular, rotationally fixes a rotatable component which is permanently coupled to a transmission output of the associated motor vehicle transmission. It is particularly preferred when this rotatable component is a transmission shaft which is connected to a transmission output in a force- and torque-transmitting manner. For this purpose, the locking pawl is pivotable about an axis, where the pivotability about the axis is the sole degree of freedom. The latter is achieved, in particular, due to the locking pawl being coupled to a housing via the axis while implementing the degree of freedom of pivotability. The housing is preferably a transmission housing. The axis is defined, in particular, by a parking lock pin, which is mounted in the housing in a fixed or floating manner.

The pivoting of the locking pawl takes place between a release position, which is associated with the deactivated state of the parking lock, and the interlock position, by which the activated state of the parking lock is achieved. The locking pawl is pivotably mounted about the axis, in particular, at a first end of the locking pawl. The locking pawl preferably has a ratchet tooth at a second end spaced apart from the axis, where the ratchet tooth engagement takes place in the interlock position, as a result of which the locking pawl couples the component of the motor vehicle transmission to be rotationally fixed to the axis and, in this case, in particular, to the parking lock pin and thus rotationally fixes the component of the motor vehicle transmission.

Furthermore, in the parking lock system according to the invention, a first actuating element and a second actuating element are provided. The first actuating element is transferrable between an engaged position and a disengaged position. When moved from the disengaged position into the engaged position, the first actuating element ensures that the locking pawl is pivoted towards its interlock position. Therefore, if the first actuating element is moved into its engaged position, the locking pawl is pivoted towards its interlock position, so that the movement of the locking pawl into its interlock position depends on the transfer of the first actuating element into its engaged position. Preferably, a coupling exists between the first actuating element and the locking pawl during the movement of the first actuating element into the engaged position, or such a coupling is established during the movement of the first actuating element into the engaged position.

If, conversely, the first actuating element is moved from the engaged position into the disengaged position, this causes the locking pawl to pivot into its release position. In this case as well, a coupling between the first actuating element and the locking pawl exists or is established during the movement of the first actuating element. It is particularly preferred, however, when the locking pawl is permitted to return from the interlock position into its release position only due to the movement of the first actuating element into the disengaged position, in that, for this purpose, an appropriate space for the locking pawl is opened up due to the movement of the first actuating element into the disengaged position. The actual return of the locking pawl into the release position then preferably takes place automatically when the first actuating element is transferred into the disengaged position, in particular primarily due to reaction forces acting in a radially outward direction, the reaction forces resulting from the contact situation of the intermeshed components and/or secondarily due to a spring force of a spring element preloading the locking pawl in the release position and/or due to the force of gravity acting on the locking pawl.

The movement of the first actuating element between the engaged position and the disengaged position, as set forth in the invention, is present, in particular, as a rotational motion, i.e., the first actuating element pivots between the engaged position and the disengaged position. Alternatively, the movement of the first actuating element could also be present as a translatory motion, however.

The second actuating element in the parking lock system according to the invention is provided for establishing a coupling with a control actuator. Within the parking lock system, an actuating motion introduced via the connected control actuator is then transmitted further via the second actuating element. The second actuating element is movable between an actuating position and a release position. This movement of the second actuating element is preferably a rotational motion, and therefore the second actuating element is pivoted from the actuating position into the release position and vice versa. In principle, the movements between the actuating position and the release position could also take place as translatory motions, however.

The first actuating element and the second actuating element are each formed, in particular, in one, respective piece within the scope of the invention. However, the first actuating element and/or the second actuating element can each have multiple individual parts, which are fixedly, i.e., captively, connected to one another.

In addition, the parking lock system according to the invention has an emergency release device, which moves the first actuating element into its disengaged position, which therefore causes the locking pawl to pivot into its release position. The emergency release device is provided, in particular, for introducing a manual motion for transferring the first actuating element into its disengaged position.

The invention now encompasses the technical teaching that the second actuating element, when moved from its actuating position into its release position, is in contact with the first actuating element and transfers the first actuating element from the engaged position into the disengaged position. In addition, the first actuating element and the second actuating element are coupled to one another via a spring element which transfers a movement of the second actuating element from the release position into the actuating position onto the first actuating element and, in so doing, induces its movement into the engaged position, whereas the spring element, in the actuating position of the second actuating element, permits a movement of the first actuating element relative to the second actuating element into its disengaged position.

In other words, the mode of operation is therefore derived and illustrated on the basis thereof in such that the second actuating element, when moved from the actuating position into the release position, directly induces the movement of the first actuating element from the engaged position into the disengaged position, in that the second actuating element is in contact with the first actuating element during this movement and thus, while moving, induces the first actuating element to move from the engaged position into the disengaged position. In addition, a spring element is provided, which couples the first actuating element and the second actuating element to one another such that, when the second actuating element is moved from the release position into the actuating position, the spring element also moves the first actuating element into the engaged position. The spring element also ensures that the first actuating element is movable relative to the second actuating element into its disengaged position, while the second actuating element, which is in the actuating position, remains in the actuating position.

Such an embodiment of a parking lock system has the advantage that, due to the contact of the second actuating element with the first actuating element during its movement from the actuating position into the release position, the first actuating element is reliably transferrable from its engaged position into the disengaged position, which results in the deactivation of the parking lock. This is the case because greater actuating forces are usually necessary to deactivate the parking lock than to activate the parking lock, since, when the locking pawl is in the interlock position, the locking pawl is usually in a preloaded state which must be released in order to deactivate the parking lock. Due to the contact of the second actuating element with the first actuating element, these actuating forces is transferrable directly from the second actuating element onto the first actuating element.

During the movement of the second actuating element in the opposite direction, i.e., during the movement from the release position into the actuating position, reaction forces are also transmitted from the second actuating element onto the first actuating element in order to induce the movement of the first actuating element into the engaged position. This does not take place directly from the second actuating element onto the first actuating element, however, but rather indirectly via the spring element. If the second actuating element is in the actuating position, the spring element also permits a movement of the first actuating element relative to the second actuating element, as a result of which the first actuating element is transferrable into its disengaged position, while the second actuating element remains in the actuating position. Consequently, the first actuating element is also movable via the emergency release device into the disengaged position, without this causing the second actuating element to move out of the actuating position. As a result, a control actuator which is integrated via the second actuating element is advantageously not simultaneously carried along, and therefore damage to the stopped control actuator, or to its mechanical latching mechanism, is prevented. For this purpose, the first actuating element and the second actuating element are to be coupled to one another merely via a spring element. Therefore, this is achievable with low manufacturing effort. In addition, a compact configuration of the parking lock system is achieved.

Essential for the invention is that the second actuating element, when moved from the actuating position into the release position, moves the first actuating element and transfers this into the disengaged position. In contrast, when the second actuating element is moved from the release position into the actuating position, the movement is transmitted via the intermediate spring element onto the first actuating element in order to move this in its engaged position. In addition, when the second actuating element is in the actuating position, the spring element must permit the movement of the first actuating element relative to the second actuating element into its disengaged position such that the second actuating element does not move and therefore remains in the actuating position. This is the case because, as a result, the first actuating element is transferrable into its disengaged position via the emergency release device when the parking lock is activated and deactivation is not possible via the control actuator connected to the second actuating element.

It is particularly preferred when the spring element is configured with respect to its characteristic curve such that the transmission of the movement of the second actuating element from the release position into the actuating position onto the first actuating element takes place while inducing the movement of the first actuating element into the engaged position, and the movement of the first actuating element relative to the second actuating element is possible when the second actuating element is in the actuating position.

In accordance with one embodiment of the invention, the second actuating element is coupled via a gear stage to a mounting interface, which is provided for a connection to the control actuator. As a result, a pre-ratio of actuating movements of the control actuator is achievable during transmission onto the second actuating element. Therefore, when a high-speed control actuator is used, a drive motion of the control actuator is converted into a movement having a higher torque and a lower actuating speed of the second actuating element. When a low-speed actuator is used, a drive motion of the control actuator is converted into a movement of the second actuating element having a higher actuating speed and a lower torque. The transmission ratio step is a spur gear stage or a planetary gear stage. Alternatively, the mounting interface is provided directly on the second actuating element, such that a rigid connection of the second actuating element to the associated control actuator is implemented.

According to one aspect of the invention, the first actuating element is pivotable between the disengaged position and the engaged position about a pivot axis, about which the second actuating element is also pivoted between its release position and its actuating position. In this case, the first actuating element and the second actuating element are therefore pivotable coaxially with one another about a common pivot axis. In particular, this pivot axis is coaxial with the axis, about which the locking pawl is pivotable. It is very particularly preferred, in some instances, when the first actuating element and the second actuating element are pivotably mounted on the parking lock pin.

In one development of the aforementioned aspect, the first actuating element is a shift bracket, which has mutually axially spaced-apart legs so as to be pivotable about the pivot axis. The second actuating element is present as a control lever, which is mounted axially between the legs of the shift bracket so as to be pivotable about the pivot axis and, when pivoted from the actuating position into the release position, comes into contact at an end, which is spaced apart from the pivot axis, with a cross-member connecting the legs of the shift bracket to one another. As a result, a suitable configuration of the parking lock system according to the invention is provided, in which the contact of the second actuating element with the first actuating element is implementable when the second actuating element is pivoted from the actuating position into the release position, and a coupling via a spring element is achievable. The term "axial" is to be understood to mean an orientation along the pivot axis.

Alternatively, but preferably in addition to, the aforementioned development, the spring element is a torsion spring, which is coaxial via one coil section with the pivot axis. A first leg of the torsion spring extending from the coil section rests against the first actuating element, while contact with the second actuating element is established at a second leg of the torsion spring extending from the coil section. The legs of the torsion spring preload the first actuating element, towards the engaged position, and the second actuating element, towards the actuating position, against each other. Advantageously, the coupling of the first actuating element and of the second actuating element is achievable in a reliable and simultaneously compact manner via the spring element, which is a torsion spring. In addition, using a torsion spring, a suitable characteristic curve is easily achieved, with which the movement of the second actuating element from the release position into the actuating position is transmitted onto the first actuating element while inducing the movement of the first actuating element into the engaged position, and the movement of the first actuating element relative to the second actuating element is possible when the second actuating element is in the actuating position. Within the scope of the invention, the spring element could alternatively be a flat spring or a compression spring, however.

In one development of the embodiment, according to which the second actuating element is coupled via a gear stage to the mounting interface, the gear stage is a spur gear stage, which includes a first spur gear and a second spur gear meshing therewith. The first spur gear is non-rotatably mounted on a control shaft, on which the mounting interface is formed, and the second spur gear is connected to the second actuating element for conjoint rotation. The second spur gear and the second actuating element are preferably connected such that they are axially adjacent to one another. Alternatively, or additionally, the second spur gear and the second actuating element are, in particular, formed in one piece.

According to one further embodiment of the invention, the emergency release device has an actuating shaft, on which an unlocking lever is non-rotatably mounted. The unlocking lever is pivotable by rotating the actuating shaft and, in this way, brought into contact with the first actuating element such that, after contact, the first actuating element is moved towards the disengaged position by further rotating the actuating shaft. This has the advantage that, when the actuating shaft is rotated, a lower actuating torque is therefore necessary to move the first actuating element, since a lever arm is created via the unlocking lever when the actuating motion is transmitted from the actuating shaft onto the first actuating element.

When the aforementioned embodiment is combined with the variant of the invention, in which the first actuating element and the second actuating element are pivotable about a pivot axis, the actuating shaft is also coaxial with this pivot axis. As a result, the unlocking lever acts via a constant contact point on the first actuating element and therefore acts as a pivot lever. Alternatively, the actuating shaft and the unlocking lever, which is non-rotatably mounted thereon, is pivotable while being offset from the pivot axis, provided that contact with the first actuating element is possible. In this case, however, a contact point of the unlocking lever would migrate with the first actuating element, whereby higher friction would arise between the unlocking lever and the first actuating element.

In one development of the invention, the cross-member transitions into one of the legs of the shift bracket via an axially outwardly projecting portion, with which the unlocking lever of the emergency release device comes into contact when the actuating shaft is rotated. As a result, a contact region is implemented on the shift bracket, which forms the first actuating element, with low manufacturing effort. As a result, the unlocking lever is easily arranged such that it lies axially next to the shift bracket.

According to a further aspect of the invention, the first actuating element is coupled to an actuating element which pivots the locking pawl towards the interlock position when the first actuating element is moved into the engaged position. When the first actuating element is moved into the disengaged position, the actuating element allows the locking pawl to pivot into the home position. In particular, the actuating element is configured as a locking cone, which, when the first actuating element is moved into its engaged position, is displaced into a position in which the locking cone forces the locking pawl to pivot towards the interlock position. When the first actuating element is moved into the disengaged position, the locking cone is displaced such that the locking pawl pivots into the release position. It is further preferred when the locking cone is guided on a guide plate or guide bush. Preferably, the actuating element and the first actuating element are coupled to one another via a connecting rod, which is preloaded, in particular, via a spring element into a position which is the engaged position of the first actuating element. When the first actuating element is a shift bracket, this connecting rod is also articulatedly connected to the shift bracket in an eccentric manner.

According to another embodiment of the invention, a parking interlock gear is provided, which has a toothing on an outer circumference, and is intended to be non-rotatably mounted on a shaft which is to be rotationally fixed via the parking lock system. The locking pawl, when in the interlock position, is moved at a portion thereof spaced apart from the pivot axis radially towards the parking interlock gear to such an extent that the locking pawl is engageable via the portion of the locking pawl into tooth gaps of the toothing.

Therefore, a parking interlock gear is provided, which is circumferentially equipped on its outer circumference with locking teeth, which form a toothing of the parking interlock gear. The parking interlock gear is non-rotatably mounted, when the parking lock system is installed, on a shaft which is to be rotationally fixed via the parking lock system when a parking lock function is activated and, therefore, is to be prevented from rotating. When the locking pawl is pivoted from the release position into the locked position, the portion of the locking pawl, in particular a ratchet tooth of the locking pawl, is moved so close to the parking interlock gear due to the pivoting that the portion engages into one of the tooth gaps when the locked position is reached. As a result, the locking pawl couples the parking interlock gear to the axis and consequently rotationally fixes the parking interlock gear.

In one development of the invention, the second actuating element is coupled to a control actuator, via which the second actuating element is transferrable from the actuating position into the release position and/or vice versa. Preferably, the control actuator is an electro-mechanical control actuator. As set forth in the present invention, without adapting the general mode of operation, the control actuator is any other type of actuator having other active principles, i.e., for example, an actuator having hydraulic or pneumatic active principles, and/or any other type of actuator having another mode of operation, i.e., for example, an actuator combined with both linearly acting as well as rotationally acting actuating elements. In addition, the associated control actuator latches, in particular, in each of the two positions of the second actuating element.

The invention also relates to a motor vehicle transmission, which is provided with a parking lock system according to one more of the above-described variants. This motor vehicle transmission is, in particular, a transmission of an electrically driven motor vehicle axle.

BRIEF DESCRIPTION OF THE DRAWINGS

An advantageous embodiment of the invention, which is explained in the following, is shown in the drawings, in which.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1-5 show perspective views of parts of a parking lock system 1 according to a preferred embodiment of the invention and provided for use in a motor vehicle transmission of an electrically driven motor vehicle drive axle.

Figure 1:
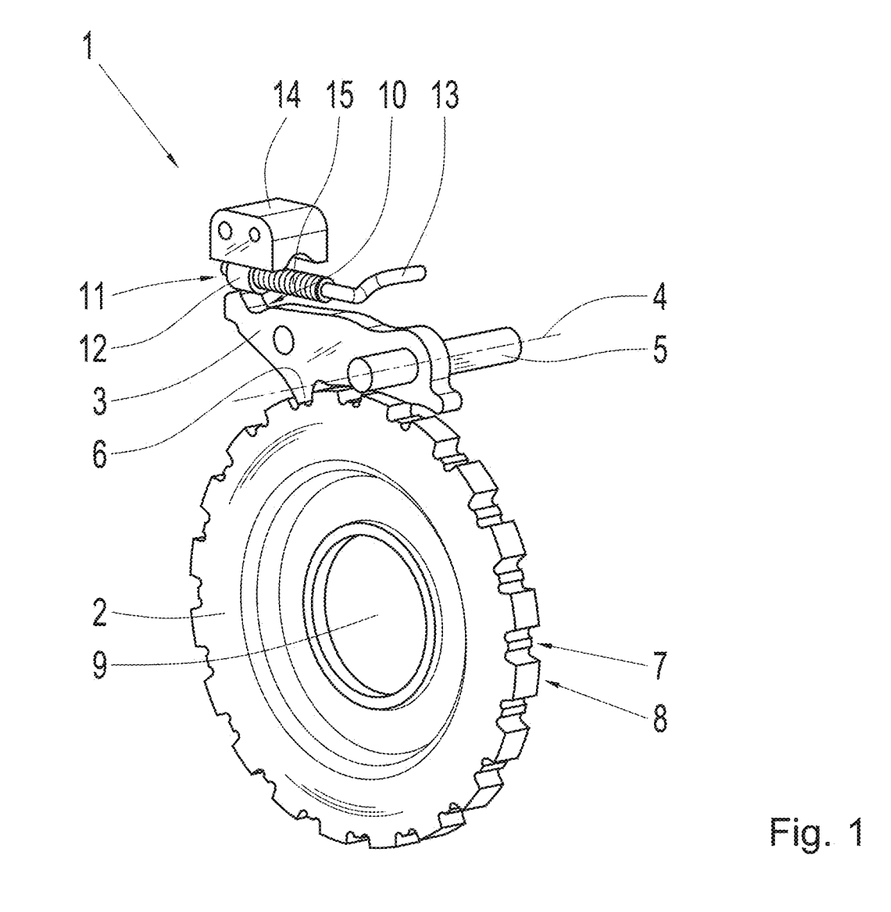
FIGS. 1-5 show different perspective views of parts of a parking lock system according to one preferred embodiment of the invention.

As is apparent in FIG. 1, the parking lock system 1 has a parking interlock gear 2 and a locking pawl 3, which is pivotable about an axis 4. The axis 4 is defined by a parking lock pin 5, the parking lock pin 5 being rotationally fixed on a housing (not shown in greater detail in this case) of the motor vehicle transmission. In addition, at a distance from the pivotable mounting of the locking pawl 3 on the parking lock pin 5, the locking pawl 3 is equipped with a ratchet tooth 6, which is formed on the locking pawl 3 so as to face the parking interlock gear 2. The ratchet tooth 6 is provided for engaging into one of multiple tooth gaps 7 in a toothing 8, which is provided on an outer circumference of the parking interlock gear 2.

A through-hole 9 extends through the parking interlock gear 2, by which, when the parking lock system 1 is installed, the parking interlock gear 2 is non-rotatably mounted on a shaft which is rotationally fixed via the parking lock system 1 when a parking lock at the motor vehicle transmission is activated. FIG. 1 shows the activated state of the parking lock, in which the locking pawl 3 engages via its ratchet tooth 6 into one of the tooth gaps 7 and, as a result, prevents the parking interlock gear 2 from rotating.

The locking pawl 3 is provided with a control contour 10 on a side facing away from the parking interlock gear 2. At the control contour 10, the locking pawl 3 is in contact with an actuating element 11, the actuating element 11 being a locking cone 12. The locking cone 12 is attached to a connecting rod 13, via which the locking cone 12 is movable in a translatory manner. The locking cone 12 is permanently guided on a guide plate 14, where, when the parking lock system 1 is installed, the guide plate 14 is connected to the housing of the motor vehicle transmission.

The connecting rod 13 and the locking cone 12 are preloaded via a spring element 15 into the position, as shown in FIG. 1, in which the locking cone 12 rests in a region of the control contour 10 that projects further towards the guide plate 14 in comparison to the remaining portion of the control contour 10. As a result, the locking pawl 3 is pivoted on the parking lock pin 5 towards the parking interlock gear 2 into an interlock position, in which the ratchet tooth 6 engages into one of the tooth gaps 7, as described above and shown in FIG. 1.

In order to deactivate the parking lock, the connecting rod 13 and the locking cone 12 are displaceable against the spring element 15 into a position in which the locking pawl 3 pivots about the pivot axis 4 towards the guide plate 14 into a release position, due to the migrated, or modified, contact of the locking cone 12 with the control contour 10. In this release position, the ratchet tooth 6 has been moved radially outwards with respect to the parking interlock gear 2 to such an extent that the ratchet tooth 6 no longer engages into one of the tooth gaps 7. This pivoting of the locking pawl 3 takes place, in particular, under the influence of a spring force of a spring element (not shown). Consequently, the parking interlock gear 2 freely rotates.

Figure 2:
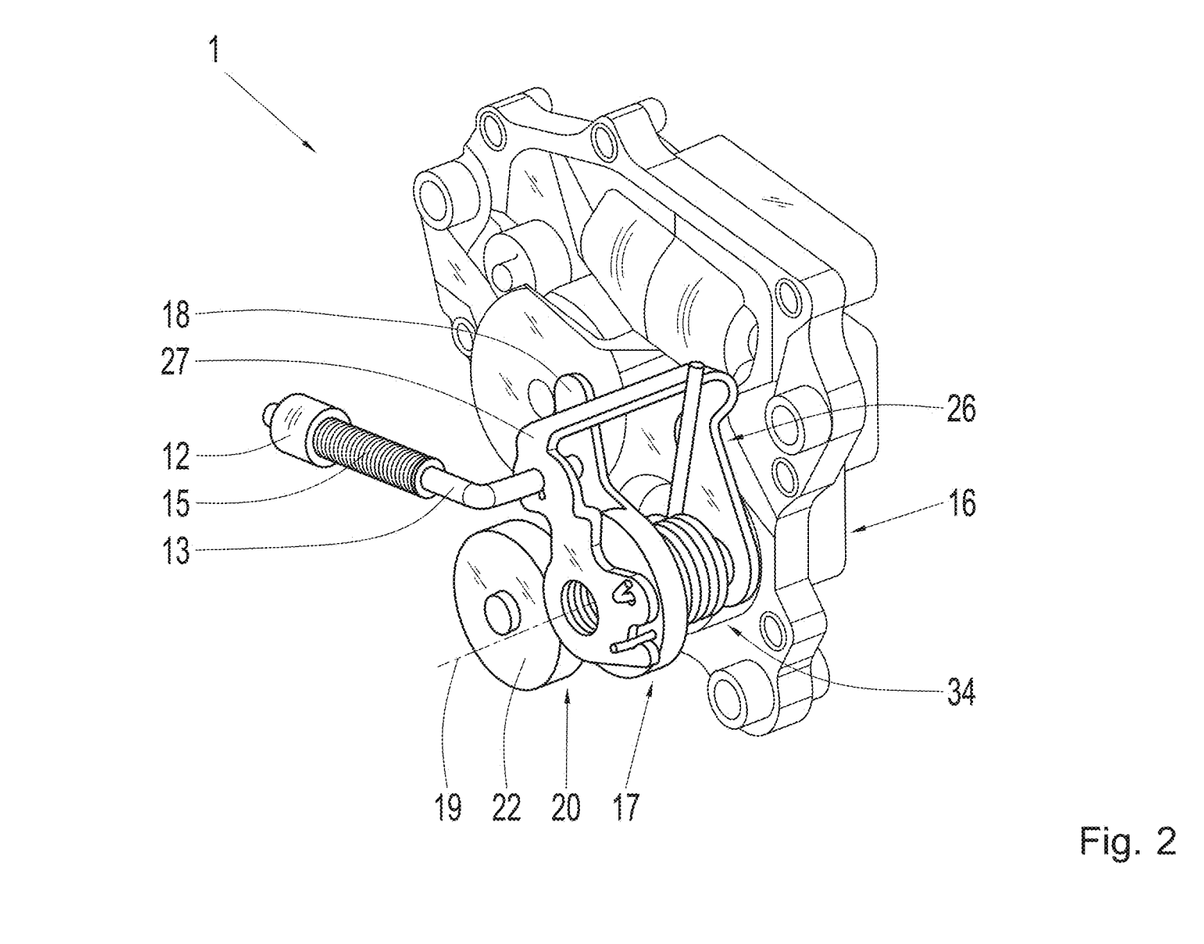

The displacement of the connecting rod 13 and of the locking cone 12 into the position associated with the release position of the locking pawl 3 and also into the other position, in which the locking pawl 3 pivots into the interlock position, is effected in the present case by an electromechanical control actuator 16. The control actuator 16 is indicated in FIG. 2, which shows a further part of the parking lock system 1. For the sake of clarity, the parking interlock gear 2, the locking pawl 3 and the guide plate 14 are not shown in FIG. 2. The control actuator 16 is coupled to an actuating element 17, the actuating element 17 being a control lever 18 which is pivotable about a pivot axis 19. The pivot axis 19 is also defined by the parking lock pin 5 (which is not shown either in greater detail in FIG. 2), and therefore the pivot axis 19 and the axis 4 shown in FIG. 1 are also coaxial.

Figure 3:
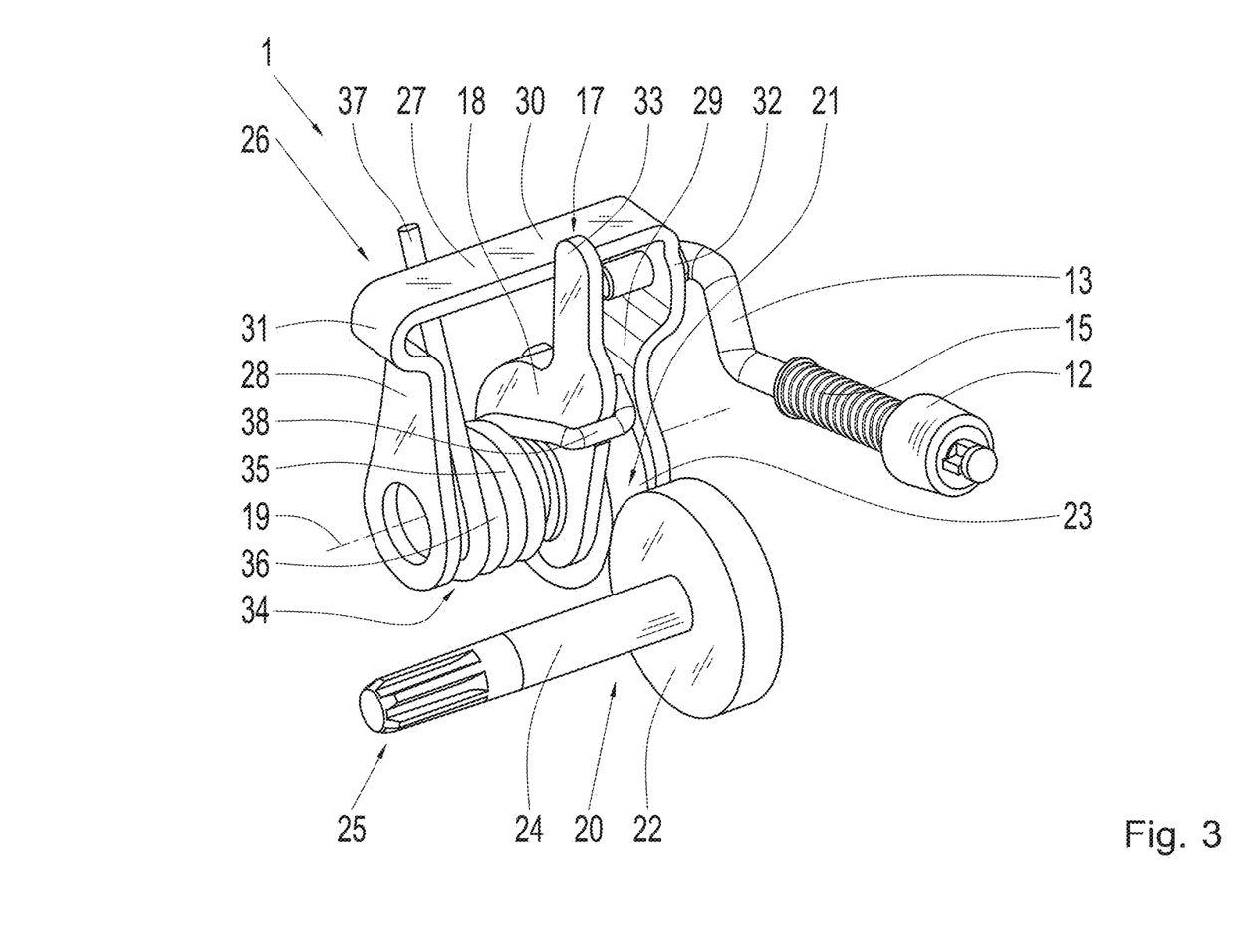

The control lever 18 is coupled to the control actuator 16 via a gear stage 20, particularly a spur gear stage 21 which has two spur gears 22, 23, as is apparent, in particular, in FIG. 3. The spur gears 22, 23 are permanently meshed with one another. The spur gear 23 is connected to the control lever 18 for conjoint rotation and is coaxial with the pivot axis 19. The spur gear 22 is non-rotatably mounted on a control shaft 24, which is axially offset from the pivot axis 19 and is connected at a mounting interface 25, particularly a driving toothing, to the control actuator 16 for conjoint rotation. Via the spur gear stage 21, an actuating motion of the control actuator 16 is therefore transmitted onto the control lever 18, which pivots about the pivot axis 19.

The parking lock system 1 also has a further actuating element 26, which is also pivotable about the pivot axis 19 and is a shift bracket 27. As is apparent, in particular, in FIG. 3, the shift bracket 27 has two legs 28, 29, by which the shift bracket 27 is arranged so as to be pivotable about the pivot axis 19 and which are connected to one another via a cross-member 30. The cross-member 30 transitions into each of the legs 28, 29 via one outwardly projecting portion 31, 32, respectively. At the projecting portion 32, the connecting rod 13 is also attached to the shift bracket 27. Due to the connection being situated eccentrically to the pivot axis 19, a pivoting of the shift bracket 27 about the pivot axis 19 is therefore converted into a corresponding displacement of the connecting rod 13 and thus of the locking cone 12.

Figure 4:
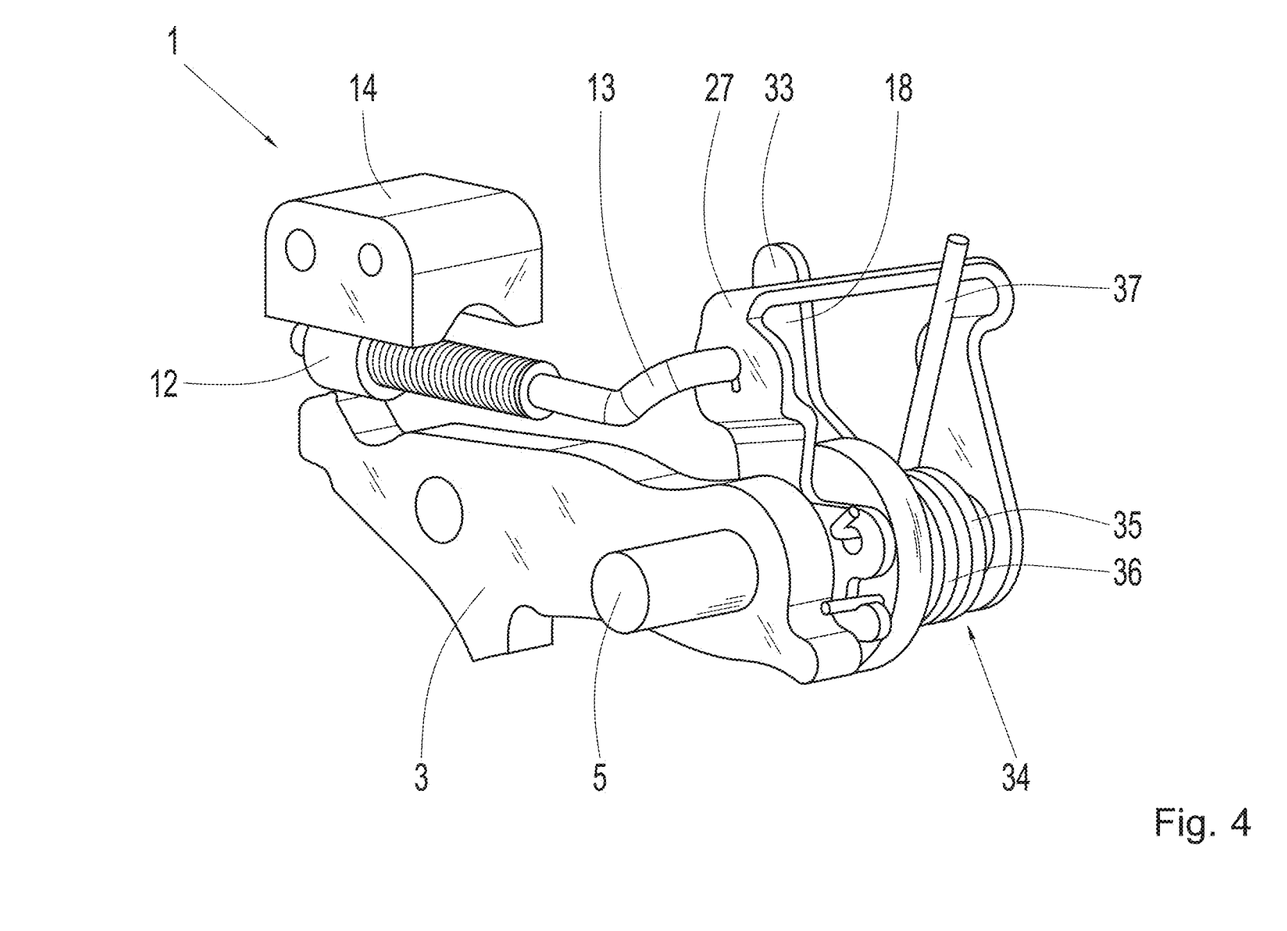
Figure 5:
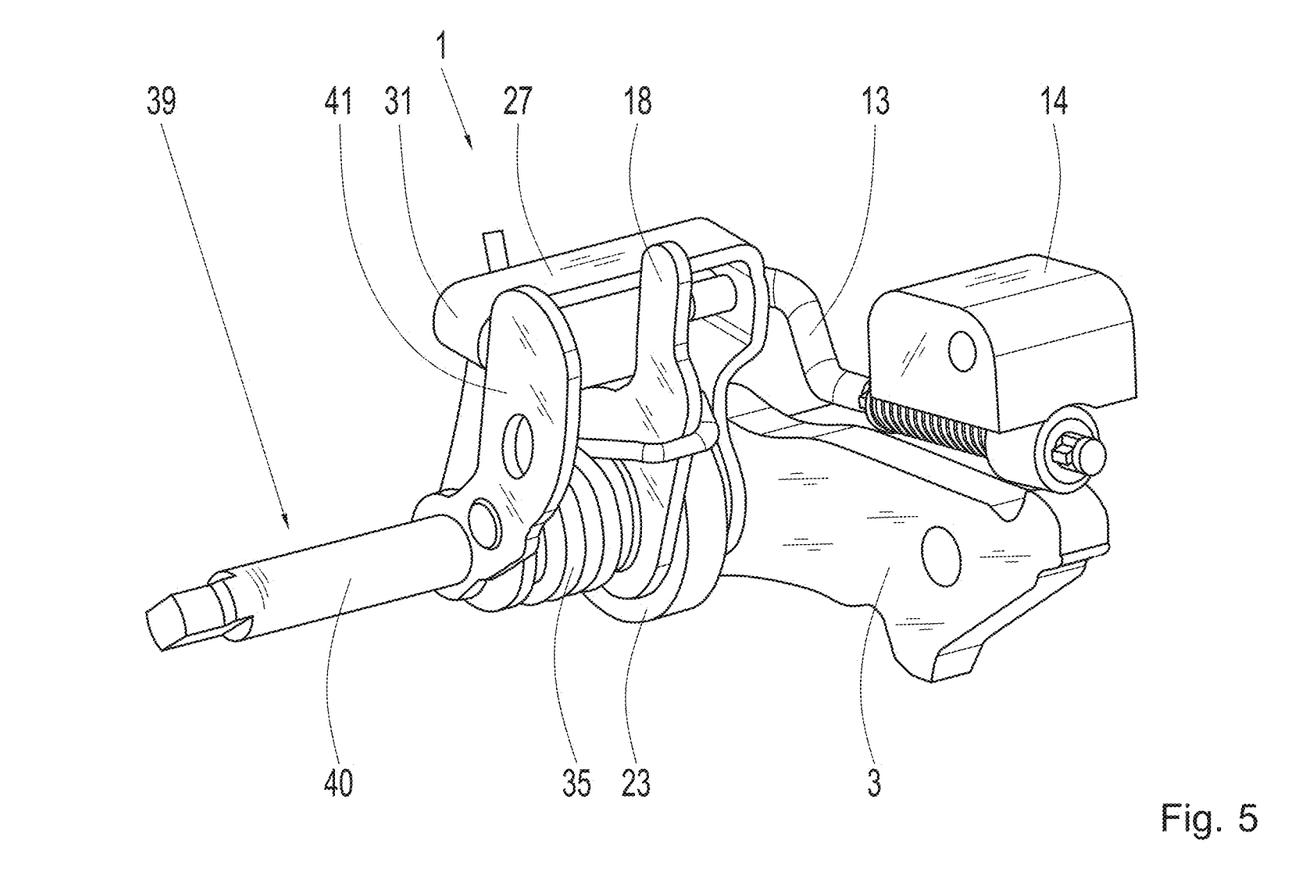

In FIGS. 2 and 3 and also in the further FIGS. 4 and 5, the shift bracket 27 is shown in a state in which it has been pivoted into an engaged position. In this state, the interlock position of the locking pawl 3 is set via the connecting rod 13 and the locking cone 12. Pivoting the shift bracket 27—in the clockwise direction in FIGS. 2 and 4 and in the counterclockwise direction in FIGS. 3 and 5—into a disengaged position induces a displacement of the connecting rod and of the locking cone 12 into the position with which the release position of the locking pawl 3 is associated.

The shift bracket 27 is pivoted into its disengaged position in the present case by the control lever 18 via the control actuator 16. Particularly, the control actuator 16 initiates a corresponding pivoting of the control lever 18 about the pivot axis 19 from an actuating position into a release position via the control shaft 24 and the gear stage 20. This pivoting from the actuating position takes place in the clockwise direction in FIGS. 2 and 4 and in the counterclockwise direction in FIGS. 3 and 5. The control lever 18 is in contact at one end 33 with the shift bracket 27 and, when pivoted, carries or moves the shift bracket 27 along therewith. As a result, the shift bracket 27 is pivoted into its disengaged position and thus the deactivated state of the parking lock is brought about.

In the deactivated state of the parking lock, the control actuator 16 can also activate the parking lock, in that the control actuator 16 pivots the control lever 18 via the spur gear stage 21 from the release position back into the actuating position. Due to a spring element 34, as a torsion spring 35, it is ensured that the shift bracket 27 will simultaneously pivot. A coil section 36 of the torsion spring 35 is positioned coaxially with the pivot axis 19 and thus with the parking lock pin 5. A first leg 37 of the torsion spring 35 rests against the cross-member 30 of the shift bracket 27, while a second leg 38 of the torsion spring 35 is wrapped around the control lever 18. The torsion spring 35 ensures that the control lever 18 and the shift bracket 27 are tensioned against one another. As a result, when the control lever 18 is pivoted from the release position into the actuating position, the shift bracket 27 is simultaneously pivoted into its engaged position.

The parking lock system 1 also has an emergency release device 39, parts of which are shown only in FIG. 5 for the sake of clarity. This manually actuatable emergency release device 39 in the parking lock system 1 is provided so that the activated parking lock is able to be manually deactivated in the case of a failure of a control unit of the control actuator 16, or of the control actuator 16.

The emergency release device 39 has an actuating shaft 40, at which a manual actuating motion, as rotation, is initiated and which is arranged coaxially with the parking lock pin 5 and thus with the pivot axis 19. An unlocking lever 41 is non-rotatably mounted on the actuating shaft 40. The unlocking lever 41 is initially brought into contact with the projecting portion 31 of the shift bracket 27 by rotating the actuating shaft 40, where further rotation of the actuating shaft 40 then pivots the shift bracket 27 towards its disengaged position.

As a distinguishing feature, the shift bracket 27 undergoes this pivoting from its engaged position into the disengaged position, which is induced by the unlocking lever 41, without simultaneously pivoting of the control lever 18, which is in the actuating position. This is the case because, otherwise, a rotation of the control actuator 16 would be induced via the spur gear stage 21 and the control shaft 24, as a result of which the control actuator 16 and, in particular, a mechanical latching mechanism of the control actuator 16, could become damaged. The movement of the shift bracket 27 relative to the control lever 18, which is necessary therefor, by a relative pivoting, is made possible via the torsion spring 35, which acts as a force- and torque-transmitting element and is tensioned during this relative motion.

A characteristic curve of the torsion spring 35 is correspondingly designed or selected in order to achieve the coupling of the control lever 18 with the shift bracket 27 when the control lever 18 is pivoted from the release position into the actuating position and to allow the movement of the shift bracket 27 relative to the control lever 18 when the shift bracket 27 is pivoted via the emergency release device 39 when the control lever 18 is in the actuating position.

By the embodiment according to the invention, a compact parking lock system is obtained with low manufacturing effort. In this parking lock system, emergency unlocking is possible without this resulting in a reaction onto a control actuator.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 parking lock system
2 parking interlock gear
3 locking pawl
4 axis
5 parking lock pin
6 ratchet tooth
7 tooth gaps
8 toothing
9 through-hole
10 control contour
11 actuating element
12 locking cone
13 connecting rod
14 guide plate
15 spring element
16 control actuator
17 actuating element
18 control lever
19 pivot axis
20 gear stage
21 spur gear stage
22 spur gear
23 spur gear
24 control shaft
25 mounting interface
26 actuating element
27 shift bracket
28 leg
29 leg
30 cross-member
31 portion
32 portion
33 end
34 spring element
35 torsion spring
36 coil section
37 leg
38 leg
39 emergency release device
40 actuating shaft
41 unlocking lever

The invention claimed is:

1. A parking lock system (1) for a motor vehicle transmission, comprising:
a locking pawl (3) pivotable about an axis (4) between an interlock position and a release position, the interlock position being associated with an activated state of the parking lock system, the release position being associated with a deactivated state of the parking lock system;
a first actuating element (26) movable between a disengaged position and an engaged position, the first actuating element (26) inducing pivoting of the locking pawl (3) towards the interlock position when the first actuating element (26) moves from the disengaged position into the engaged position, the first actuating element (26) effecting pivoting of the locking pawl (3) into the release position when the first actuating element (26) moves from the engaged position into the disengaged position;

a control actuator (16);

a second actuating element (17) for coupling to the control actuator (16), the second actuating element (17) being movable between an actuating position and an element release position, the second actuating element (17) contacting the first actuating element (26) to move the first actuating element (26) from the engaged position into the disengaged position when the second actuating element (17) moves from the actuating position into the element release position;

a spring element (34) coupling the first actuating element (26) to the second actuating element (17), the spring element (34) moving the first actuating element (26) into the engaged position when the second actuating element (17) moves from the element release position into the actuating position, the spring element (34) allowing the first actuating element (26) to move relative to the second actuating element (17) into the disengaged position when the second actuating element (17) is in the actuating position; and an emergency release device (39), the first actuating element (26) being movable into the disengaged position by rotation of the emergency release device (39) while the second actuating element (17) remains in the actuating position.

2. The parking lock system (1) of claim 1, further comprising a gear stage (20), the second actuating element (17) being coupled via the gear stage (20) to a mounting interface (25) of the control actuator (16).

3. The parking lock system (1) of claim 2, wherein the gear stage (20) is a spur gear stage (21), the spur gear stage (21) comprising a first spur gear (22) and a second spur gear (23) meshing with the first spur gear (22), the first spur gear (22) being non-rotatably mounted on a control shaft (24), the mounting interface (25) being formed on the control shaft (24), the second spur gear (23) being connected to the second actuating element (17) for conjoint rotation.

4. The parking lock system (1) of claim 1, wherein the first actuating element (26) is pivotable about a pivot axis (19) between the disengaged position and the engaged position, and wherein the second actuating element (17) is pivotable about the pivot axis (19) between the element release position and the actuating position.

5. The parking lock system (1) of claim 4, wherein the spring element (34) is a torsion spring (35), a coil section (36) of the torsion spring (35) being coaxial with the pivot axis (19), a first leg (37) and a second leg (38) of the torsion spring (35) each extending from the coil section (36), the first leg (37) resting against the first actuating element (26), the second leg (38) contacting the second actuating element (17), the first leg (37) and the second leg (38) of the torsion spring (35) preloading the first actuating element (26) towards the engaged position and the second actuating element (17) towards the actuating position.

6. The parking lock system (1) of claim 4, wherein the first actuating element (26) is a shift bracket (27), the shift bracket (27) having legs (28, 29) for pivoting about the pivot axis (19), the legs (28, 29) being axially spaced-apart, the legs (28, 29) being connected to one another by a cross-member (30), wherein the second actuating element (17) is a control lever (18), the control lever (18) being mounted axially between the legs (28, 29) of the shift bracket (27) for pivoting about the pivot axis (19), an end (33) of the control lever (18) spaced apart from the pivot axis (19) contacting the cross-member (30) when the control lever (18) is pivoted from the actuating position into the element release position.

7. The parking lock system (1) of claim 6, wherein the emergency release device (39) has an actuating shaft (40) and an unlocking lever (41) non-rotatably mounted on the actuating shaft (40), the unlocking lever (41) being pivotable, via rotation of the actuating shaft (40), into contact with the first actuating element (26) and further pivotable, via further rotation of the actuating shaft (40) after contacting the first actuating element (26), to move the first actuating element (26) towards the disengaged position.

8. The parking lock system (1) of claim 7, wherein the actuating shaft (40) is coaxial with the pivot axis (19).

9. The parking lock system (1) of claim 7, wherein the cross-member (30) transitions into one of the legs (28, 29) of the shift bracket (27) via an axially outwardly projecting portion (31), the unlocking lever (41) of the emergency release device (39) coming into contact with the axially outwardly projecting portion (31) when the actuating shaft (40) is rotated.

10. The parking lock system (1) of claim 1, wherein the first actuating element (26) is coupled to an actuating element (11), the actuating element (11) pivoting the locking pawl (3) towards the interlock position when the first actuating element (26) is moved into the engaged position, the actuating element (11) allowing the locking pawl (3) to pivot into the release position when the first actuating element (26) is moved into the disengaged position.

11. The parking lock system (1) of claim 1, further comprising a parking interlock gear (2), the parking interlock gear (2) having a toothing (8) on an outer circumference, the parking interlock gear (2) being non-rotatably mounted on a shaft, wherein a portion of the locking pawl (3) spaced apart from the axis (4) is movable radially towards the parking interlock gear (2) into engagement with tooth gaps (7) of the toothing (8) when the locking pawl (3) is moved into the interlock position.

12. The parking lock system (1) of claim 1, wherein the second actuating element (17) is coupled to the control actuator (16), the control actuator (16) being an electromechanical control actuator (16), the second actuating element (17) being transferrable between the actuating position into the element release position by the control actuator (16).

13. A motor vehicle transmission of an electrically driven motor vehicle drive axle, the motor vehicle transmission comprising the parking lock system (1) of claim 1.

14. A parking lock system (1) for a motor vehicle transmission, comprising:

a locking pawl (3) pivotable about an axis (4) between an interlock position and a release position, the interlock position being associated with an activated state of the parking lock system, the release position being associated with a deactivated state of the parking lock system;

a first actuating element (26) movable between a disengaged position and an engaged position, the first actuating element (26) inducing pivoting of the locking pawl (3) towards the interlock position when the first actuating element (26) moves from the disengaged position into the engaged position, the first actuating element (26) effecting pivoting of the locking pawl (3) into the release position when the first actuating element (26) moves from the engaged position into the disengaged position;

a control actuator (16);
a second actuating element (17) for coupling to the control actuator (16), the second actuating element (17) being movable between an actuating position and an element release position, the second actuating element (17) contacting the first actuating element (26) to move the first actuating element (26) from the engaged position into the disengaged position when the second actuating element (17) moves from the actuating position into the element release position;
a gear stage (20), the second actuating element (17) being coupled via the gear stage (20) to a mounting interface (25) of the control actuator (16), the gear stage (20) being a spur gear stage (21) comprising a first spur gear (22) and a second spur gear (23), the second spur gear (23) meshing with the first spur gear (22), the first spur gear (22) being non-rotatably mounted on a control shaft (24), the mounting interface (25) being formed on the control shaft (24), the second spur gear (23) being connected to the second actuating element (17) for conjoint rotation;
a spring element (34) coupling the first actuating element (26) to the second actuating element (17), the spring element (34) moving the first actuating element (26) into the engaged position when the second actuating element (17) moves from the element release position into the actuating position, the spring element (34) allowing the first actuating element (26) to move relative to the second actuating element (17) into the disengaged position when the second actuating element (17) is in the actuating position; and
an emergency release device (39), the first actuating element (26) being movable into the disengaged position by the emergency release device (39).

\* \* \* \* \*